F. S. ELLETT.
CLUTCH FOR CONCENTRIC ROTARY PARTS.
APPLICATION FILED JUNE 7, 1909.

934,597.

Patented Sept. 21, 1909.

WITNESSES:
Clarence W. Carroll
D. Gurnee.

INVENTOR:
Frederick S. Ellett
by Osgood & Davis
his attorneys

UNITED STATES PATENT OFFICE.

FREDERICK S. ELLETT, OF ELMIRA, NEW YORK.

CLUTCH FOR CONCENTRIC ROTARY PARTS.

934,597.
Specification of Letters Patent. Patented Sept. 21, 1909.

Application filed June 7, 1909. Serial No. 500,729.

*To all whom it may concern:*

Be it known that I, FREDERICK S. ELLETT, a citizen of the United States, and resident of Elmira, in the county of Chemung and State of New York, have invented certain new and useful Improvements in Clutches for Concentric Rotary Parts, of which the following is a specification.

This invention relates to clutches for concentric rotary parts. Its object is to meet the requirements of motor cycles, and like vehicles, in which the engine is cranked by the propulsion of the vehicle, and which, on occasion, are required to run free of the engine, and remain stationary while the engine continues to run.

Figure 1:
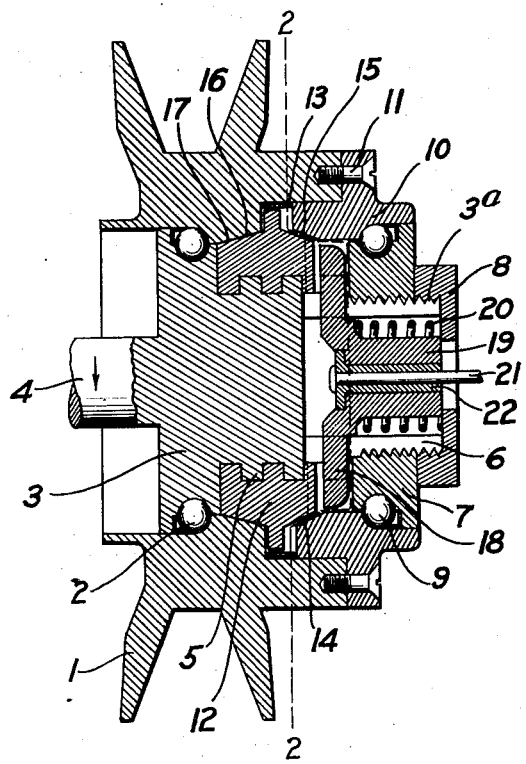
Figure 2:
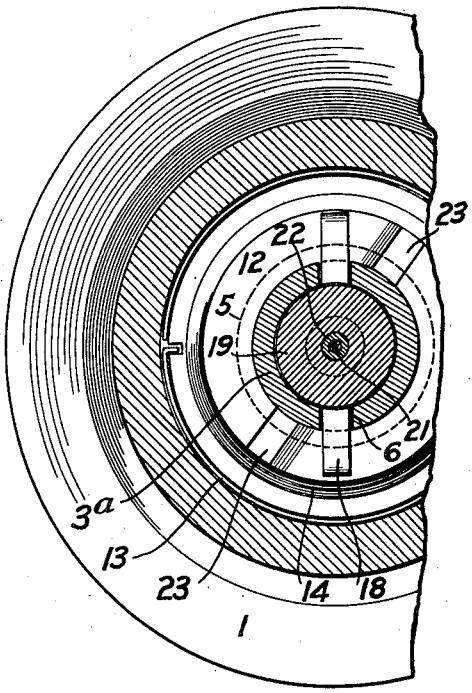
Figure 3:
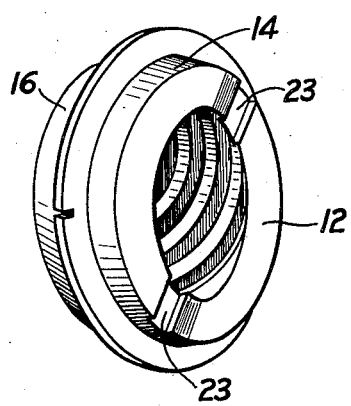
Figure 4:
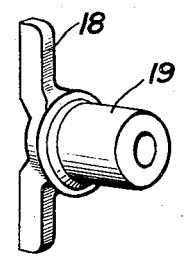

In the drawings:—Figure 1 is a longitudinal vertical section of the complete device; Fig. 2 is a section on the line 2—2 of Fig. 1; Fig. 3 is a perspective view of the shiftable connector; and Fig. 4 is a similar view of the locking bar.

The pulley 1, which may be of any desired cross-section, is revolubly supported by ball bearings 2 upon a block 3 which is an enlarged extension of the motor-shaft 4. Beyond the balls 2 the diameter of the block 3 is reduced, and has a heavy triple thread 5 cut upon it. The extreme end 3ª of the block 3, which has a longitudinal slot 6, is of still smaller diameter, and a cone 7 is threaded upon the end 3ª, and locked in place by a nut 8. Said cone carries ball bearings 9, upon which a cap 10 is supported that is practically an integral part of the pulley 1, inasmuch as it is fastened to the latter by screws 11.

As the parts described stand by themselves, it is obvious that the pulley 1 and the motor-shaft 4 are independently revoluble. In order that the motor may drive the pulley, and the pulley, when it overruns the motor, may serve to rotate the latter, a shiftable connector is interposed between the motor-shaft and the pulley. The connector shown in the drawings is a nut 12 that is grooved internally to fit the screw-threads 5 on the block 3. A spring retarder 13 that encircles said nut, acts as a drag against the inner periphery of the pulley 1 when the latter is revolved, and so secures the rotation of the nut on the shaft that shifts it to one side or the other when the wheel and shaft revolve at different speeds. The direction of the threads is such that when the pulley 1 rotates in advance of the shaft, the nut 12 moves in one direction (toward the right in Fig. 1) till its tapered end 14 wedges into a tapered socket 15 in the cap 10. As the nut can move no farther, it binds against the threads 5, and so turns the block 3 and cranks the motor. The latter at once speeds ahead of the pulley, so that the threads 5 carry the nut 12 in the opposite direction (toward the left in Fig. 1). Another tapered face 15 on the inner end of the nut then engages and wedges into a tapered socket 17 in the pulley 1, so that the latter is revolved with the motor-shaft 4, and drives the vehicle.

In order to prevent the nut 12 from moving over to engage the socket 15, when it is desired to drive or run the vehicle without turning the motor-shaft, a bar 18 is employed that is adapted to enter a slot 6 in the shaft-extension 3ª. The bar 18 forms part of a sleeve 19, and is pressed toward the nut 12 by a coiled spring 20, but normally is prevented from touching the nut by a rod 21, that extends through an inner sleeve 22. Said rod is connected with a suitable manipulating lever on some part of the vehicle (not shown).

When it is desired to hold the nut 12 midway between the sockets 15 and 17, so that it engages neither of them, the rod 21 is released and the spring 20 presses the bar 18 against the outer face of said nut. In this outer face are notches 23 (Fig. 3) which are adapted to receive the bar 18. When the nut 12 is against the socket 17 (Fig. 1), so that the motor is driving the wheel 1, the relative positions of the notches 23 and the bar 18 are as shown in Fig. 2. Said nut therefore must be carried a part of a revolution about the shaft 3 before the bar 18 can engage said notches. The nut is so moved when the pulley 1 overruns the motor, and is assured by the drag of the retarder 13 on the pulley, as previously described. When the nut has moved far enough to permit the bar 18 to be pressed into the notches 23, it is free from both the sockets 17 and 15, and rotates with the shaft of the motor. When it is desired to connect the pulley 1 with the motor, the rod 21 is pulled out till it releases the bar 18 from the nut 12, which is then carried into the socket 15 as before described. The slots 23 are so arranged that the bar 18 can only enter them when the nut 12 is in an intermediate position where it will be out of contact with both cone surfaces 17 and 15.

The application of this clutch to motor cycles is readily perceived, for it is possible with it to propel the machine by the pedals without at the same time driving the motor, and, furthermore, it enables the rider to disconnect the driven wheel from the motor so that the former is free, as in coasting, or while the machine is standing temporarily.

In order to disconnect the pulley 1 from the motor-shaft when the latter is rotating, it is necessary to slow down the motor, so that the pulley 1 will overrun the motor-shaft, when the nut 12 moves to the right and the bar 18 engages its notches 23. By withdrawing the bar 18 from the notches 23, the nut 12 is released and caused to move into the socket 17 again, so that the motor picks up the pulley and drives the machine as before. It should also be noted that while the bar 18 is in its retracted position (withdrawn from the socket 23), the pulley 1 and motor-shaft will always be clutched together, for if the motor-shaft is revolving at greater speed than the pulley, the nut 12 will be caused to clutch the cone surface 17 on said pulley, whereas, on the other hand, when conditions are reversed, said nut 12 will engage the cone surface 15.

What I claim is:—

1. The combination with a rotary shaft, of a concentric wheel, one of said parts carrying oppositely-placed clutch members; a movable clutch-block, concentric with said shaft and wheel, located between said clutch members; means operated by the relative rotation of said shaft and wheel, and adapted, according to their relative speeds, to move said block into engagement with one of said clutch members; and a movable locking device carried by one of the parts first mentioned and adapted to lock the clutch-block to it in the nonengaging position of said block; substantially as shown and described.

2. The combination with a rotary shaft, of a concentric wheel, one of said parts carrying oppositely-placed clutch members, and the other having a threaded part located between said clutch members; a clutch block threaded to coöperate with the aforesaid threaded part, and adapted in either extreme position to engage a clutch member, and thereby connect said shaft and wheel; and a movable locking device carried by the part having the threaded connection with the clutch-block, and adapted to lock the clutch-block thereto in the nonengaging position of said clutch-block; substantially as shown and described.

3. The combination with a rotary shaft, of a clutch-block carried by said shaft, and movable longitudinally thereon; a wheel, concentric with said shaft, having a clutch member on each side of said block; means carried by said shaft, adapted by the relative rotation of said shaft and block to move the latter longitudinally into engagement with one clutch member or the other of said wheel, according to the direction of rotation of said block with respect to said shaft; and a movable device carried by the shaft, adapted to lock said block to it in the nonengaged position of the latter; substantially as shown and described.

4. The combination with a rotary shaft, having a screw-threaded portion, of a threaded clutch-block thereon; a wheel concentric with said shaft, having a clutch member on each side of said block, at a distance apart greater than the width of said block; and a locking device carried nonrotatably by said shaft, movable thereon, and adapted to engage said block to lock it to the shaft in its intermediate position with respect to said clutch members; substantialy as shown and described.

5. The combination with a rotary shaft, having a screw-threaded portion, of a wheel concentric with said shaft, having oppositely-placed clutch members; a threaded clutch-block between said clutch members, adapted to engage one or the other, and having shoulders on one side; and a longitudinally movable locking device, rotative with said shaft, and adapted to engage the shoulders on said block in the intermediate position of the latter; substantially as shown and described.

6. The combination with a rotary shaft, having a screw-threaded portion, of a wheel concentric with said shaft, having oppositely-placed clutch members; a threaded clutch-block between said clutch members, adapted to engage one or the other, and having shoulders on one side; a longitudinally movable locking device, rotative with said shaft, and adapted to engage the shoulders on said block in the intermediate position of the latter; a spring normally adapted to hold said locking device in contact with said block; and means for drawing said locking device out of contact with said block; substantially as shown and described.

7. The combination with the pulley 1 having the clutch face 17, of the rotary shaft 4, having the screw-threaded portion 5, and slot 6; the cap 10, having the clutch face 15, secured to said wheel; the screw-threaded nut 12, having the clutch faces 14 and 16 and notches 23; the locking bar 18 in said slot 6, adapted to enter said notches in the intermediate position of said nut; a spring adapted normally to hold said bar in one position; and means for placing it in the other position; substantially as shown and described.

8. The combination with a rotary shaft, of a concentric wheel, one of said parts carrying oppositely-placed clutch members; a movable clutch-block concentric with said shaft and wheel, located between said clutch members; means operated by the relative rotation of said shaft and wheel, and adapted according to their relative speeds to move said block into engagement with one of said clutch members; a movable locking device carried by one of the parts first mentioned, and adapted to lock the clutch-block to it in the non-engaged position of said block; a spring normally adapted to hold said locking device in one position; and means for moving said locking device into its other position; substantially as shown and described.

FREDERICK S. ELLETT.

Witnesses:
J. L. HERCHISKEL,
JOHN D. ELLETT.